A. SHERWOOD.

Improvement in Harvester-Rakes.

No. 130,597.  
Patented Aug. 20, 1872.

Witnesses  
J. R. Nottingham  
Edmund Masson

Inventor.  
Allen Sherwood  
By atty. A. B. Stoughton.

UNITED STATES PATENT OFFICE.

ALLEN SHERWOOD, OF AUBURN, NEW YORK.

IMPROVEMENT IN HARVESTER-RAKES.

Specification forming part of Letters Patent No. 130,597, dated August 20, 1872.

*To all whom it may concern:*

Be it known that I, ALLEN SHERWOOD, of Auburn, in the county of Cayuga and State of New York, have invented certain new and useful Improvements in Raking or Delivering Apparatus for Harvesting-Machines; and I do hereby declare the following to be a full, clear, and exact description of the same, reference being had to the accompanying drawing making a part of this specification, in which—

Figure 1:
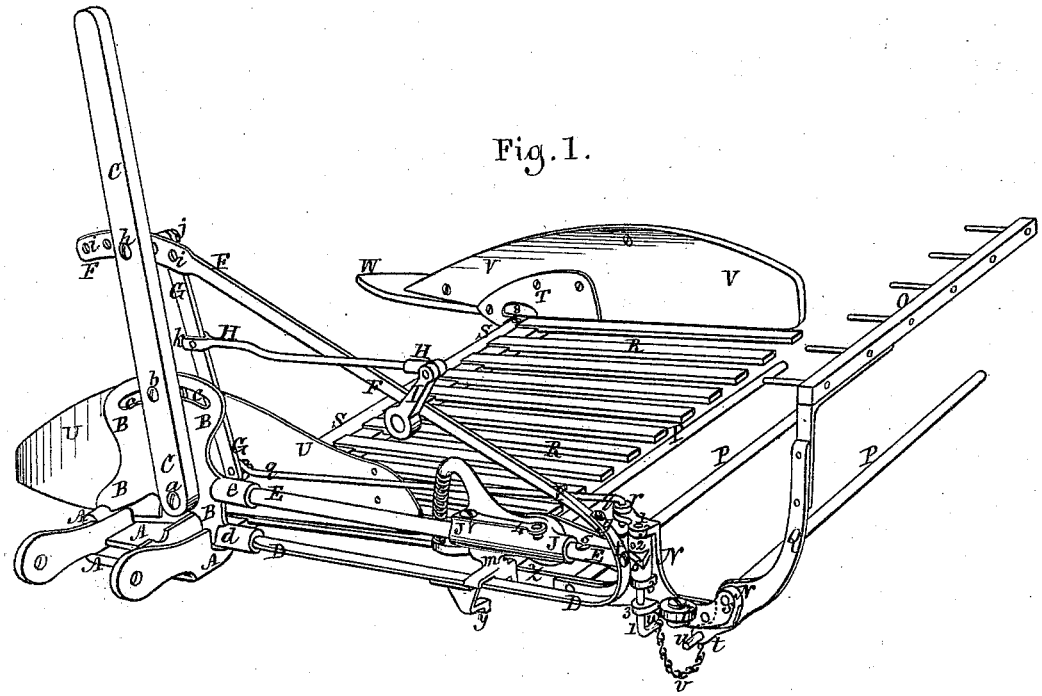
Figure 2:
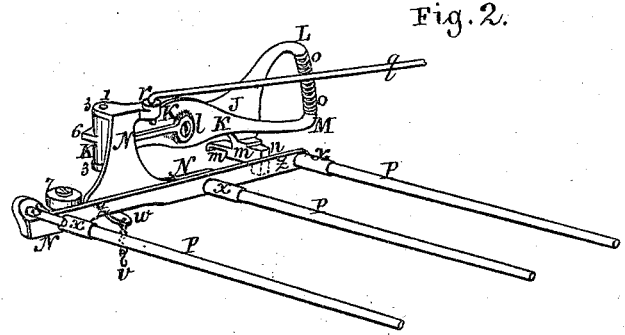

Figure 1 represents in perspective the raking or delivering apparatus, and so much of a harvesting-machine as will show its application thereto and operation therewith. Fig. 2 represents in perspective the grain-carrier and its appliances, detached or separated from the other parts of the machine.

Similar letters of reference, where they occur in the separate figures, denote like parts of the apparatus in the drawing.

My invention relates, first, to the combination of a slatted platform with a rake that has, first, a rearward rectilinear motion, then a combined rising and swinging motion rearward, then a swinging and rectilinear motion toward the front, and finally a downward motion into or upon the grain that has fallen upon the slatted grain-receiver or holder. My invention further relates to the combination of a rake having the motions hereinabove mentioned, a slatted grain-receiver, and a grain-carrier, the rake working above the slatted receiver, with its teeth dropping through between the slats thereof, and the grain-carrier working below the slatted receiver and moving and swinging with the rake, but not rising and falling with it; and my invention further relates to the several mechanisms which will be hereinafter more particularly specified, for operating, controlling, and regulating the hereinabove-mentioned rake and grain-carrier.

To enable others skilled in the art to make and use my invention, I will proceed to describe the same with reference to the drawing.

To the inside shoe, A, there is attached a plate or frame, B, to which, at the point $a$, there is pivoted a post or standard, C, that may be leaned forward or backward, and when adjusted be firmly held in that position by a set-screw, $b$, passing through the curved slot $c$ in said plate B. To the plate or frame B there is attached, in any suitable manner, as at the point $d$, a bar, D, which extends rearward, and serves as a brace and a guide-way both, as will be explained hereafter; and to this plate or frame B, above the bar D, and as at the point $e$, there is attached a guide-rail, E, parallel to and extending rearward with the bar D, and united to or with it at the point $f$. The bar D extends above the point $f$, and, at its upper portion, as at $g$, a brace, F, is fastened to it, which brace, from that point, extends forward and is bolted, at $h$, to the post or standard $c$. The forward end of this brace F is furnished with a series of holes, $i\ i$, &c., into which a wrist-pin, $j$, may be fixed or adjusted. On the wrist-pin $j$ is hung a lever, G, so as to be suspended therefrom, and at a suitable point, $k$, in the line or length of this lever, there is pivoted one end of a connecting-rod, H, the other end of which is attached to a crank, I, which crank may be fastened to the inner end of the main driving-shaft, such as are used on harvesting-machines, so as to revolve with said drive-shaft and give a vibrating movement to the pendulum-lever G around its wrist-pin or support $j$. On the guide-rail E, which, for convenience, is of round iron, there is placed a sliding piece, J, to the grain side of which, as at $l$, Fig. 2, there is pivoted a bearing-piece, K, which carries and supports most of the rake and grain-carrier mechanism; and, though the guide-rail E mainly carries and supports the sliding piece J, yet there is a projection, $m$, on said sliding piece, which may be supported by and slide upon the under bar D, which gives it more firmness; and upon this projection $m$ there is a stop, $n$, against which the grain-carrier comes after it is swung into position to move under the grain-holder after having delivered a gavel upon the ground. On the sliding piece J there is an arm, L, and on the bearing-piece K there is a similar arm, M, which two arms have a coiled or other spring, $o$, between them to relieve any jar or sudden blow that might come upon the rake or the grain-carrier when they arrive at the end of their several movements and are momentarily at rest. In the rear end of the bearer K there is a stud or pin, 1, which is made fast or immovable after it is placed therein, (by a pin, as at 2, or otherwise,) and to this stud or pin 1 is pivoted, by lugs 3, the plate N, which carries both the rake O and the grain-carrier P. From the lower end of the pendulum-lever G there extends a connecting-rod, $q$, to and attached with the bearing-plate N, through a crank-arm, $r$, so that this connecting-rod $q$, through and by means of the motion it receives from the swinging lever G, not only moves the slide J, bearer K, plate N, and rake and grain-carrier O P backward and forward, but swings the latter around on the vertical stud 1 and imparts to the rake its rising and falling motions, as will be explained. The rake O, by means of its bent shank Q, is pivoted to the plate N at the point $s$, so that said rake, in addition to its traversing motion with the slide J, may have a rising-and-falling motion upon its pivotal connection at $s$. The tail $t$ of the rake-shank extends beyond its pivotal point, and has attached to it, or to a pin or stud, $u$, passing through it, a chain, $v$, or other flexible tie, the other end of which chain or tie is attached to an arm, $w$, on the lower end of the stationary stud or pin 1, so that when the rake arrives at the end of its rearward traverse and the chain becomes "taut" or strained up, by the tendency of the slide and rake to move beyond the end of its rectilinear traverse, it will raise up the rake, and its momentum in rising will carry it beyond a vertical plane through its pivot, and the tail $t$ of the rake coming against one of the sockets $x$, Fig. 2, will hold the rake up in that position. When the slide, rake, and other co-operative parts or attachments have moved forward upon the rail E until the rake comes opposite to where the grain is collected upon the receiver R, the stud or pin $u$ comes against a stop or projection, $y$, on the bar D, and the continued motion of the slide throws the rake down upon the grain on the receiver, the points of the rake-teeth passing into or through the grain thereon, and opposite or into the spaces between the slats of the grain-receiver. On the plate N and moving with it there is a bar, $z$, having ferrules or sockets $x$ in or on it, into which fingers or rods P are placed, said fingers or rods forming a carrying device that moves under the grain-receiver R and traverses with the rake O. When the rake-teeth have penetrated the grain on the receiver and start rearward to deliver it behind the machine and out of the way of the return swath, the carrier P goes with it; and when both have arrived at the rear of the grain-receiver the grain slides off of the receiver and is caught on the carrier and held there by the rake until both have arrived at or near the delivery point, and there both swing around about a quarter of a circle, when the rake is thrown up, releasing the grain, and the fingers of the carrier then pointing rearward, the grain slides off and is delivered in a gavel upon the ground, with the straws at right angles to the direction in which the machine is moving. When the slide J has arrived at the rear end of its traverse upon the rail E, a spring-latch, 4, thereon, drops into a depression, 5, in the rail, and holds the slide with sufficient firmness to prevent it from moving, except when moved positively by the power that works it, but not so rigidly but that when started forward again the spring-latch will yield and allow it to move forward.

On the boss or hub of the bearing piece K there is a shoulder or projection, 6, against which the plate N, when it is swung around with the rake and carrier, comes, and defines the extent of its swinging motion. Upon the plate N there is also a friction-roll, 7, which runs against the edge of the bar D and steadies the parts in their traverse back and forth without undue friction.

It is not absolutely necessary that the carrier should be always used with the rake, except when the grain is to be carried backward, turned quarter around, and dropped in rear of the main-frame side of the platform, grain-table, or receiver. The rake can be used for clearing the receiver without the carrier, but it will not deliver the grain in the same position, or possibly in as good condition for binding. The carrying-fingers P may be taken out of their sockets $x$, and all the other parts continue their operations just as well as with them in their places.

The grain falling upon the slats of the receiver, which are united at their front ends only, will yield under the weight of the grain and come down closer to the ground, so that the rake will readily clear them of the cut grain, and, when relieved, they will spring back again.

The finger-bar is shown at S. It is united to the inside shoe or shoe-holder A and to the outside shoe-holder T, in which latter there is an opening, $s$, for the cutters or cutter-bar to move through, there being a seat and guide on the inner shoe for said cutter-bar to move against. U is the inside, V the outside divider or fence, and W the outside shoe.

Having thus fully described my invention, what I claim therein as new, and desire to secure by Letters Patent, is—

1. In combination with a slatted platform, between the slats of which the fingers of the rake pass when down, the plate N having a forward and rearward traversing and a swinging motion, the rake O pivoted to said plate so that said rake shall not only move and swing with said plate, but also be capable of rising and falling independently thereof, as and for the purpose described.

2. I also claim, in combination with the traversing and turning plate N and rake O moving both with and independent of said plate, the traversing and swinging carrier P, as and for the purpose described and represented.

3. I also claim, in combination with the slide J and plate K pivoted thereto and carrying the hinged plate N, the spring o for relieving the parts of such strains and jars as they may be subject to in their operations, as described and represented.

4. I also claim, in combination with the slide J and rail E, the spring-latch 4, and depression or stop 5, as and for the purpose described and represented.

ALLEN SHERWOOD.

Witnesses:
A. G. WHEELER,
G. D. RUSSELL.